(12) United States Patent
Kitahara et al.

(10) Patent No.: US 11,181,411 B2
(45) Date of Patent: Nov. 23, 2021

(54) FLOW RATE MEASUREMENT SYSTEM

(71) Applicant: DENSO CORPORATION, Kariya (JP)

(72) Inventors: Noboru Kitahara, Kariya (JP); Hisato Kuramoto, Anjou (JP)

(73) Assignee: DENSO CORPORATION, Kariya (JP)

( * ) Notice: Subject to any disclaimer, the term of this patent is extended or adjusted under 35 U.S.C. 154(b) by 282 days.

(21) Appl. No.: 16/553,439

(22) Filed: Aug. 28, 2019

(65) Prior Publication Data

US 2019/0383655 A1 Dec. 19, 2019

Related U.S. Application Data

(63) Continuation of application No. PCT/JP2018/005432, filed on Feb. 16, 2018.

(30) Foreign Application Priority Data

Mar. 1, 2017 (JP) .............................. JP2017-038789

(51) Int. Cl.
*G01F 1/696* (2006.01)
*G01F 1/69* (2006.01)
*G01F 1/05* (2006.01)
*G01F 1/12* (2006.01)
*G01F 1/684* (2006.01)

(52) U.S. Cl.
CPC ............ *G01F 1/6965* (2013.01); *G01F 1/053* (2013.01); *G01F 1/125* (2013.01); *G01F 1/69* (2013.01); *G01F 1/6842* (2013.01)

(58) Field of Classification Search
CPC . G01F 1/6965; G01F 1/69; G01F 1/72; G01F 1/50; G01F 1/08; G01F 1/125
See application file for complete search history.

(56) References Cited

U.S. PATENT DOCUMENTS 5,817,932 A * 10/1998 Nishimura ................ G01F 1/72
73/114.34
2006/0016254 A1 1/2006 Okuda et al.

FOREIGN PATENT DOCUMENTS

JP 2015-175329 10/2015

* cited by examiner

*Primary Examiner* — Paul M. West
(74) *Attorney, Agent, or Firm* — Nixon & Vanderhye P.C.

(57) ABSTRACT

A flow rate measurement system outputs a measurement value which represents a magnitude of a flow rate and a flow direction of a fluid that flows through a particular main passage. The system includes a bypass passage disposed in the main passage, a detection unit disposed in the bypass passage that outputs a detection value corresponding to a magnitude of a flow rate and a flow direction of the fluid flowing through the bypass passage, and a calculation unit that, by using the detection value, calculates the measurement value by compensating as needed for a delay in the change in flow rate in the bypass passage with respect to the change in flow rate in the main passage. The compensation is based on whether a change of flow direction has occurred in the main passage or the bypass passage.

6 Claims, 7 Drawing Sheets

FLOW RATE MEASUREMENT SYSTEM

CROSS-REFERENCE TO RELATED APPLICATIONS

The present application is a continuation application of International Patent Application No. PCT/JP2018/005432 filed on Feb. 16, 2018, which designated the U.S. and claims the benefit of priority from Japanese Patent Application No. 2017-38789 filed on Mar. 1, 2017. The entire disclosures of all of the above applications are incorporated herein by reference.

TECHNICAL FIELD

The present disclosure relates to a flow rate measurement system.

BACKGROUND

A flow rate measurement system which outputs a measurement value indicating a magnitude of a flow rate and a flow direction of a fluid flowing through a predetermined main passage may be, for instance, applied as a device for measuring a flow rate of an intake air drawn into an internal combustion engine.

SUMMARY

A flow rate measurement system according to the present disclosure outputs a measurement value which represents a magnitude of a flow rate and a flow direction of a fluid that flows through a particular main passage in which backflow may occur, and may include a housing, a detection unit, and a calculation unit.

The housing includes a bypass passage which takes in a portion of the fluid flowing through the main passage and returns the portion of the fluid back to the main passage, the housing being disposed in the main passage. The detection unit is disposed in the bypass passage and outputs a detection value corresponding to a magnitude of a flow rate and a flow direction of the fluid flowing through the bypass passage. The calculation unit, by using the detection value, performs an arithmetic operation for outputting the measurement value.

The calculation unit calculates the measurement value by compensating as needed for a delay in the change in flow rate in the bypass passage with respect to the change in flow rate in the main passage. Further, the calculation unit performs an arithmetic operation required for the compensation by using at least one of loss coefficients of the main passage or the bypass passage, and selectively uses one of at least two calculation methods depending whether a magnitude of the loss coefficient is small or a magnitude of the loss coefficient is large.

In addition, the calculation unit includes a determination unit that determines whether or not the flow direction has changed in at least one of the main passage or the bypass passage, uses a large side calculation method related to the calculation of the loss coefficient if the determination unit determines that the flow direction has changed, and uses a small side calculation method related to the calculation of the loss coefficient if the determination unit determines that the flow direction has not been changed.

BRIEF DESCRIPTION OF DRAWINGS

The above and other objects, features and advantages of the present disclosure will become more apparent from the following detailed description made with reference to the accompanying drawings. In the drawings.

DETAILED DESCRIPTION

Hereinafter, embodiments for carrying out the present disclosure will be described based on examples. It should be noted that the examples disclose specific examples, and it is needless to say that the present disclosure is not limited to the examples.

Embodiment

The configuration of a flow rate measurement system 1 according to an embodiment will be described with reference to the drawings. The flow rate measurement system 1 may be abbreviated to the measurement system 1. In the present embodiment, the measurement system 1 is used to measure the flow rate of intake air of an internal combustion engine for a vehicle. The internal combustion engine is sometimes abbreviated to an engine 2.

Figure 1:
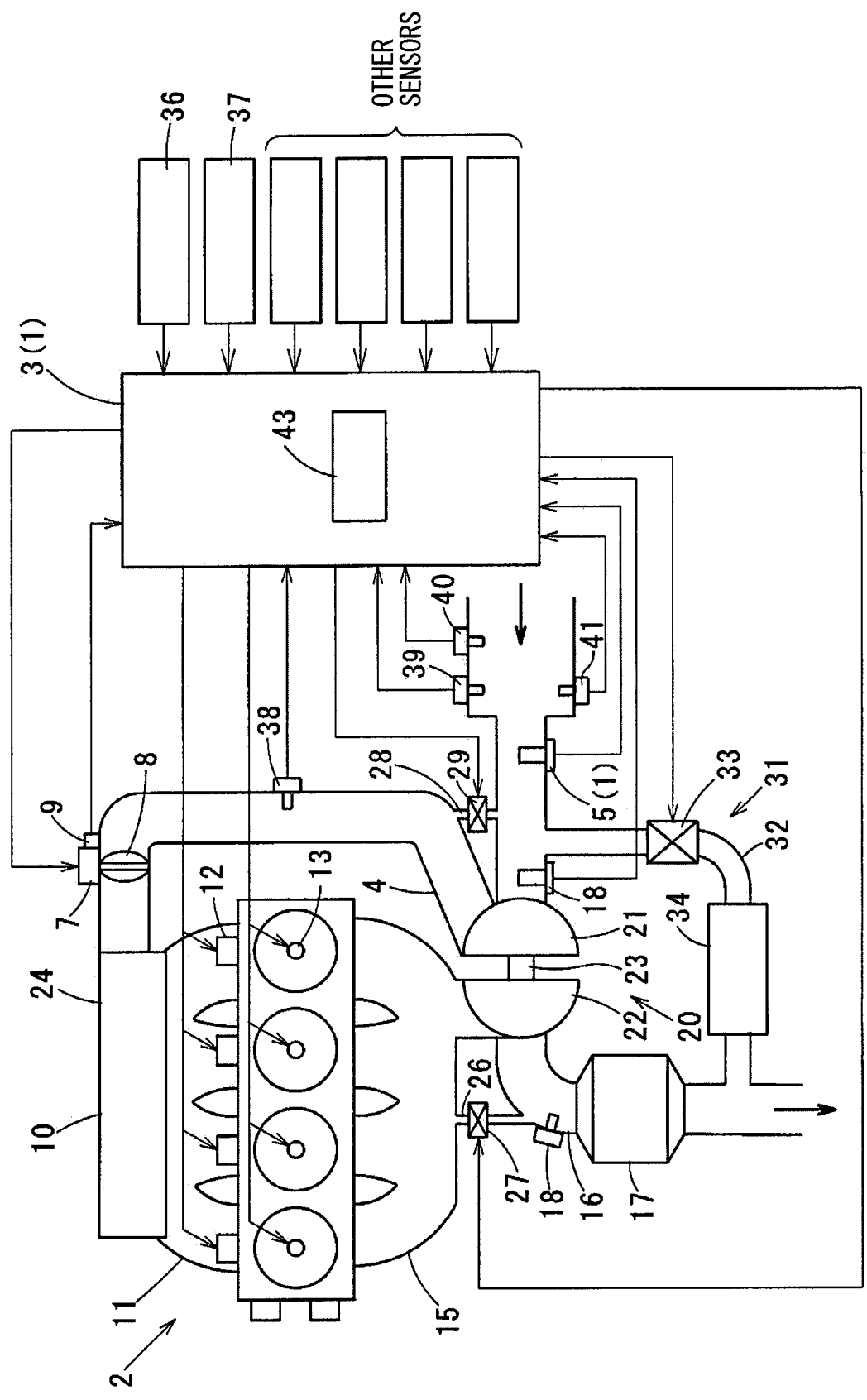
FIG. 1 is a configuration diagram of an entire control system of an internal combustion engine.

Therefore, a schematic configuration of the entire control system of the engine 2 will be described above with reference to FIG. 1.

The control system of the engine 2 includes an electronic control unit (ECU) 3 for controlling an operation state of the engine 2.

In the engine 2, an airflow meter 5 for detecting a flow rate of an intake air is provided at an upstream portion of an intake pipe 4. A throttle valve 8 whose opening degree is adjusted by a throttle actuator 7 such as a DC motor is provided on a downstream side of the airflow meter 5. The throttle opening of the throttle valve 8 (throttle opening degree) is detected by a throttle opening sensor 9 provided integrally with the throttle actuator 7. A surge tank 10 is provided on the downstream side of the throttle valve 8, and an intake manifold 11 leading to an intake port of each cylinder is attached to the surge tank 10.

The intake port and an exhaust port of the engine 2 are respectively provided with an intake valve and an exhaust valve (both of which are not shown). The engine 2 is provided with a fuel injection valve 12 and an ignition plug 13 for each cylinder.

An exhaust manifold 15 is connected to an exhaust port of the engine 2, and an exhaust pipe 16 is connected to a collecting portion of the exhaust manifold 15. The exhaust pipe 16 is provided with a catalyst 17 for purifying harmful components in an exhaust gas. Note. An air-fuel ratio sensor 18 for detecting an air-fuel ratio of an air-fuel mixture in the exhaust gas as a detection target is provided on an upstream side of the catalyst 17.

A turbocharger 20 is provided between the intake pipe 4 and the exhaust pipe 16. The turbocharger 20 includes an intake compressor 21 that is disposed on the upstream side of the throttle valve 8 in the intake pipe 4, an exhaust turbine 22 that is disposed on the upstream side of the catalyst 17 in the exhaust pipe 16, and a rotation shaft 23 that connects the intake compressor 21 and the exhaust turbine 22. When the exhaust turbine 22 is rotationally driven by the exhaust gas flowing through the exhaust pipe 16, the intake compressor 21 is rotationally driven along with the rotation of the exhaust turbine 22, and the intake air is compressed and supercharged by a compression force generated by the rotation of the intake compressor 21.

The intake pipe 4 is provided with an intercooler 24 as a heat exchanger for cooling the supercharged intake air on the downstream side of the throttle valve 8. The intake air is cooled by the intercooler 24, thereby being capable of inhibiting a decrease in the filling efficiency of the air. The intercooler 24 is, for example, a water-cooled type, and is disposed in a path different from a coolant water path of the engine 2. In the embodiment, the intercooler 24 is provided integrally with the surge tank 10.

The upstream side and the downstream side of the exhaust turbine 22 communicate with each other through an exhaust bypass passage 26, and a waste gate valve 27 for opening and closing the exhaust bypass passage 26 is provided in the exhaust bypass passage 26. The waste gate valve 27 may be referred to as a WGV 27. The amount of exhaust gas supplied to the exhaust turbine 22 increases or decreases in accordance with the opening or closing of the WGV 27, to adjust the rotational speeds of the exhaust turbine 22 and the intake compressor 21.

The upstream side and the downstream side of the intake compressor 21 communicate with each other through an intake bypass passage 28, and an air bypass valve 29 for opening and closing the intake bypass passage 28 is provided in the intake bypass passage 28. The air bypass valve 29 may be referred to as an ABV 29. The ABV 29 is opened to release a surplus pressure between the turbocharger 20 and the throttle valve 8, thereby being capable of eliminating a so-called surging of the turbo.

The engine 2 is provided with an EGR device 31 that recirculates part of the exhaust gas into the intake pipe 4. The EGR device 31 includes an EGR pipe 32 that connects the intake pipe 4 and the exhaust pipe 16, an EGR valve 33 of an electromagnetic drive type for adjusting the flow rate of the exhaust gas flowing through the EGR pipe 32, and an EGR cooler 34 as a heat exchanger for cooling the exhaust gas. The EGR cooler 34 is, for example, a water-cooled type, and is disposed in a coolant water path of the engine 2.

The EGR pipe 32 connects the downstream side of the exhaust turbine 22 and the catalyst 17 in the exhaust pipe 16 and the upstream side of the intake compressor 21 in the intake pipe 4. For that reason, the EGR device 31 is a so-called low pressure loop exhaust reflux system.

The control system of the engine 2 includes various sensors such as a crank angle sensor 36 for outputting a crank angle signal at every predetermined crank angle of the engine 2, a water temperature sensor 37 for detecting a coolant water temperature of the engine 2, an intake air temperature sensor 38 for detecting a temperature of the intake air, a humidity sensor 39 for detecting a humidity of an outside air, an outside air temperature sensor 40 for detecting an outside air temperature, and an atmospheric pressure sensor 41 for detecting an atmospheric pressure.

The ECU 3 is mainly configured by a microcomputer 43 having CPUs, ROMs, RAMs, and the like as well known, and executes various control programs stored in the ROM to perform various controls of the engine 2. In other words, the microcomputer 43 controls the operations of the throttle valve 8, the fuel injection valve 12, the ignition plug 13, the EGR valve 33, the WGV 27, the ABV 29, and the like based on the detection values input from the various sensors.

Next, the measurement system 1 will be described in detail.

The flow rate measurement system 1 includes a housing 45 and a detection unit 46 which configure the airflow meter 5, and a calculation unit 47 which is a part of the functions of the ECU 3.

Figure 2:
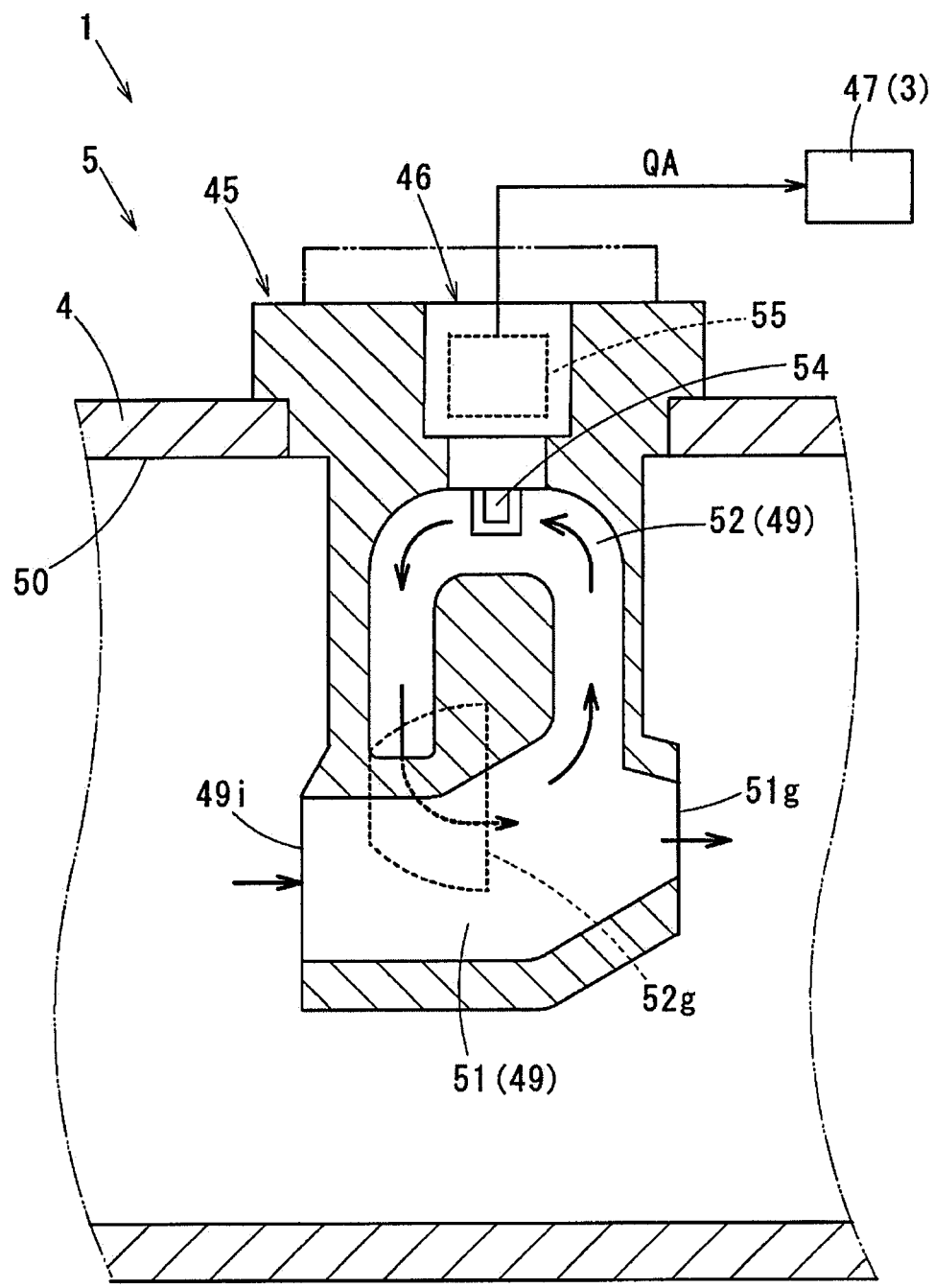
FIG. 2 is a cross-sectional view showing a configuration of an airflow meter.

First, the housing 45 and the detection unit 46 will be described with the use of the airflow meter 5 shown in FIG. 2.

The housing 45 has a bypass passage 49 for taking in a part of the fluid flowing in the intake pipe 4 and returning the part of the fluid into the intake pipe 4 again, and is disposed in the intake pipe 4. The passage of the fluid in the intake pipe 4 may be referred to as a main passage 50. In this example, the bypass passage 49 has a first passage portion 51 that extends straight substantially in parallel to the flow of the main passage 50, and a second passage portion 52 that branches from the first passage portion 51 and swirls the flow direction in the housing 45, and an outlet 51g of the first passage portion 51 and outlets 52g of the second passage portion 52 exist separately. In the present embodiment, the bypass passage 49 may be referred to as a housing passage.

The second passage portion 52 is provided so that the flow direction is rotated by 360°, and further branches into two portions so as to sandwich the first passage portion 51 on the upstream side of the branching position. For that reason, there are two outlets 52g, and the two outlets 52g are both open toward the downstream side.

An inlet 49i of the bypass passage 49 is provided so as to open toward the upstream side in the housing 45. Also, the outlet 51g is located downstream of the entrance 49i and the two outlets 52g, and both of the outlets 52g are located between the inlet 49i and the outlet 51g along the flow direction.

With the configuration described above, in the bypass passage 49, dust or the like contained in the fluid travels straight through the first passage portion 51 and returns from the outlet 51g to the main passage 50, and the fluid with reduced dust or the like passes through the second passage portion 52.

The detection unit 46 is provided, for example, as an assembly incorporating a sensitive unit 54 and a processing unit 55 as follows.

The sensitive unit 54 is a portion for outputting a signal corresponding to the magnitude of the flow rate of the fluid flowing through the second passage portion 52 and the flow direction of the fluid, and has, for example, a well-known structure. In other words, the sensitive unit 54 is a thermal flow rate sensor with a known structure having a heat generating resistive element for increasing or decreasing the heat generation amount generated by energization and multiple temperature measurement resistive elements disposed on the upstream side and the downstream side of the heat generation resistor in the flow direction in the second passage portion 52, on a substrate surface.

In addition, the sensitive unit 54 is disposed so as to protrude from the second passage portion 52, and the heat generating resistive element and the temperature measurement resistor are exposed to the flow of the second passage portion 52, and a temperature difference is generated between the temperature measurement resistive elements provided on the upstream side and the downstream side by heat radiation from the heat generation resistors to the fluid.

Then, the energization of the heat generation resistor is controlled so that the heat generation amount generated by the heat generating resistive element increases or decreases in accordance with the increase or decrease in the flow rate in the bypass passage 49, the temperature of the heat generation resistor is kept constant by the energization control, the temperature difference between the temperature measurement resistive elements on the upstream side and the downstream side is varied in accordance with the increase or decrease in the flow rate, and a signal corresponding to the flow rate is output.

The processing unit 55 controls the energization of the heat generating resistive element, performs a predetermined conversion process on the signal output from the sensitive unit 54, and outputs the converted signal to the ECU 3 as a detection value QA by the detection unit 46.

With the configuration described above, the detection unit 46 generates the detection value QA corresponding to the flow rate and the flow direction of the fluid flowing through the second passage portion 52, and outputs the detection value QA to the ECU 3.

Next, the calculation unit 47 as a part of the functions of the ECU 3 will be described with reference to a block diagram in FIG. 3. The calculation unit 47 performs arithmetic operation for outputting a measurement value Q as a numerical value for use in various controls using the detection value QA output from the airflow meter 5.

In this example, in the flow rate measurement system 1, the change in the flow rate in the bypass passage 49 is delayed behind the change in the flow rate in the main passage 50. Therefore, the calculation unit 47 has a function of compensating for such a delay. In other words, since the detection value QA by the detection unit 46 is delayed behind an actual flow rate at the same time in the main passage, the calculation unit 47 compensates for the delay of the detection value QA as a calculation for outputting the measurement value Q.

In other words, the calculation unit 47 calculates the measurement value Q by compensating for the fact that the change in the flow rate in the bypass passage 49 is delayed behind the change in the flow rate in the main passage 50 as necessary.

In the above compensation, the calculation unit 47 performs the following arithmetic operation to calculate the measurement value Q. In other words, in a pressure in the intake pipe 4 (that is, the pressure in the main passage 50), future compensation values (P0 to P2) for the delay and a future delay value estimated from the detection value QA of the present flow rate are calculated. The future delay value may be referred to as a delay value P3.

Then, the compensation values (P0 to P2) are added with the delay value (P3) to calculate a value of a future pressure without a delay in the main passage 50, a numerical value of a future flow rate without a delay in the main passage 50 is calculated according to a predicted value P, and the numerical value is output as the measurement value Q. The value of the future pressure may be referred to as the predicted value P.

In the process of calculating the compensation values (P0 to P2), the calculation unit 47 calculates both loss coefficients Cs and Cb of the main passage 50 and the bypass passage 49 for use. Then, in the calculation of the loss coefficient Cs, two calculation methods are selectively used when the magnitude of the loss coefficient Cs is small and when the magnitude is large, and in the calculation of the loss coefficient Cb, two calculation methods are selectively used when the magnitude of the loss coefficient Cb is small and when the magnitude is large. In the present embodiment, the calculation of the loss coefficient Cs includes a large side calculation and a small side calculation. In that case, the large side calculation is a calculation when the magnitude of the loss coefficient Cs is too small, and the small side calculation is a calculation when the magnitude of the loss coefficient Cs is too large. In the present embodiment, the calculation of the loss coefficient Cb includes a large side calculation and a small side calculation. In that case, the large side calculation is a calculation when the magnitude of the loss coefficient Cb is too small, and the small side calculation is a calculation when the magnitude of the loss coefficient Cb is too large. In the present embodiment, the large side calculation may be referred to as a large side calculation method, and the small side calculation may be referred to as a small side calculation method.

Further, the calculation unit 47 has a determination unit for determining whether or not the flow direction has changed in at least one of the main passage 50 and the bypass passage 49, and when the determination unit determines that the flow direction has changed, the calculation method on the large side is used for each of the loss coefficients Cs and Cb, and when the determination unit determines that the flow direction has not changed, the calculation method on the small side is used for each of the loss coefficients Cs and Cb.

Hereinafter, the delay compensation by the calculation unit 47 will be described in detail with reference to FIGS. 3 to 7.

Figure 3:
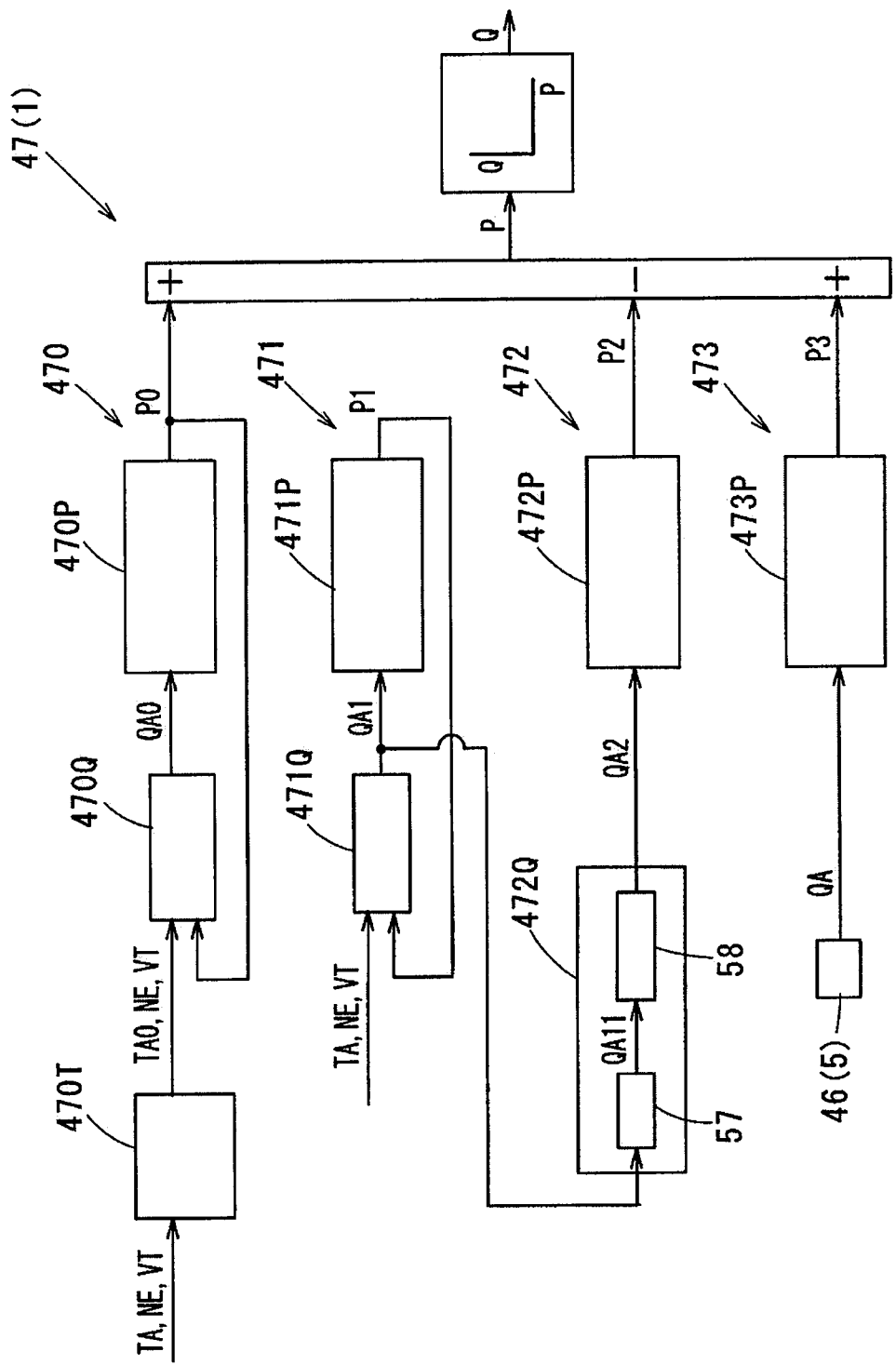
FIG. 3 is a block diagram showing a calculation unit.

First, in FIG. 3, P0, P1, P2, and P3 represent numerical values of pressures in the main passage 50, and P0 is a future value calculated based on the operation state of the engine 2, and is used for calculating the compensation values (P0 to P2). P0 may be referred to as a dummy predicted value P0. P2 is a future delay value calculated based on the operation state of the engine 2, and is used for calculating the compensation values (P0 to P2). P2 may be referred to as a dummy delay value P2. P1 is a current value calculated based on the operation state of the engine 2, and is used to calculate the dummy delay value P2. P1 may be referred to as a dummy estimation value P1.

Further, QA0, QA1, and QA2 represent numerical values of the flow rate in the main passage 50, and QA0 is a future value calculated based on the operation state of the engine 2, and is used for calculation of the dummy predicted value P0. The QA0 may be referred to as a dummy predicted value QA0. The QA2 is a future delay value calculated based on the operation state of the engine 2, and is used to calculate the dummy delay value P2. The QA2 may be referred to as a dummy delay value QA2. The QA1 is a present value calculated based on the operation state of the engine 2, and is used to calculate the dummy estimation value P1. The QA1 may be referred to as a dummy estimation value QA1.

Further, TA and TA0 represent numerical values of the throttle opening degree, TA is a value detected by the throttle opening degree sensor 9, and TA0 is a future value calculated based on the detection value TA. In that instance, TA may be referred to as the detection value TA, and TA0 may be referred to as the predicted value TA0. NE is the rotation speed of the engine 2 calculated based on a crank angle signal output from the crank angle sensor 36, and VT is a valve timing set by the ECU 3. NE and VT may be referred to as a rotational speed NE and a valve timing VT, respectively.

Next, the function of the calculation unit 47 will be described in detail.

The calculation unit 47 includes a calculation system 470 for calculating the dummy predicted value P0 based on the operation state of the engine 2, a calculation system 471 for calculating the dummy estimation value P1 based on the operation state of the engine 2, a calculation system 472 for calculating the dummy delay value P2 using the dummy estimation value P1, and a calculation system 473 for calculating the delay value P3 according to the detection value QA of the current flow rate.

The calculation system 470 includes a prediction unit 470T, a prediction unit 470Q, and a prediction unit 470P.

The prediction unit 470T calculates the predicted value TA0, which is a numerical value in the future, in the throttle opening degree with the use of the detection value TA. In this example, the future numerical value is a numerical value after a predetermined time has elapsed from the current, and is, for example, a numerical value at the time of closing the intake valve of the engine 2. Therefore, the prediction unit 470T calculates the predicted value TA0 according to the detection value TA based on the rotational speed NE and the valve timing VT of the engine 2.

The prediction unit 470Q calculates a dummy predicted value QA0 of the flow rate in the main passage 50. In the calculation of the dummy predicted value QA0, the prediction unit 470Q uses the predicted value TA0 of the throttle opening degree, the rotational speed NE of the engine 2, the valve timing VT, the predicted dummy value P0 of the pressure of the main passage 50, and the like. The dummy predicted value P0 is calculated by the prediction unit 470P to be described below.

The prediction unit 470P calculates a dummy predicted value P0 of the pressure of the main passage 50. In the calculation of the dummy predicted value P0, the prediction unit 470P uses the dummy predicted value QA0 of the flow rate in the main passage 50.

The calculation system 471 includes an estimation unit 471Q and an estimation unit 471P.

The estimation unit 471Q calculates the dummy estimation value QA1 of the flow rate in the main passage 50. In the calculation of the dummy estimation value QA1, the estimation unit 471Q uses the detection value TA of the throttle opening degree, the rotational speed NE of the engine 2, the valve timing VT, the dummy estimation value P1 of the pressure of the main passage 50, and the like. The dummy estimation value P1 is calculated by the estimation unit 471P to be described below.

The estimation unit 471P calculates the dummy estimation value P1 of the pressure of the main passage 50. In the calculation of the dummy estimation value P1, the estimation unit 471P uses the dummy estimation value QA1 of the flow rate in the main passage 50.

The calculation system 472 includes a prediction unit 472Q and a prediction unit 472P.

The prediction unit 472Q calculates the dummy delay value QA2 of the flow rate in the main passage 50. Then, in the calculation of the dummy delay value QA2, the prediction unit 472Q calculates the dummy delay value QA2 with the use of a bypass reference unit 57 and a heat radiation reference unit 58, which will be described later. The dummy estimation value P1 is used to calculate the dummy delay value QA2.

The prediction unit 472P calculates the dummy delay value P2 of the pressure of the main passage 50. In the calculation of the dummy delay value P2, the prediction unit 472P uses the dummy delay value QA2 of the flow rate in the main passage 50.

The calculation system 473 includes a prediction unit 473P.

The prediction unit 473P calculates a delay value P3 of the pressure of the main passage 50. In the calculation of the delay value P3, the prediction unit 473P uses the detection value QA of the airflow meter 5.

The delay value P3 and the dummy delay value P2 have the same response.

Then, the dummy delay value P2 calculated by the calculation systems 471 and 472 is subtracted from the dummy predicted value P0 calculated by the calculation system 470 to calculate a future compensation values (P0 to P2) for the delay, and the future compensation values (P0 to P2) are added to the future delay value P3 calculated by the calculation system 473.

As a result, the predicted value P without any delay is calculated, and the predicted value P is applied to a predetermined map or the like to calculate the measurement value Q of the flow rate without any delay.

Next, the bypass reference unit 57 and the heat radiation reference unit 58 included in the prediction unit 472Q will be described in detail.

According to the structure in which the thermal type flow rate sensor is accommodated in the bypass passage 49 like the airflow meter 5, the change in the flow rate in the bypass passage 49 is delayed behind the change in the flow rate in the main passage 50. In addition, the heat radiation from the heat generating resistive element to the fluid is delayed due to the heat capacity of the assembly or the like forming the detection unit 46.

Due to those two main delay factors, the detection value QA detected by the airflow meter 5 is delayed behind the actual flow rate at the same time in the main passage 50.

Therefore, in order to perform compensation in consideration of the delay of the detection value QA due to the passage of the fluid through the bypass passage 49, the bypass reference unit 57 is provided in the prediction unit 472Q. In that case, the delay of the detection value QA may be referred to as a delay caused by bypassing. In addition, in order to perform compensation in consideration of a delay in the detection value QA due to a delay in heat radiation from the heat generating resistive element to the fluid, the heat radiation reference unit 58 is provided in the prediction unit 472Q. In that case, the delay of the detection value QA may be referred to as a delay caused by heat radiation.

Figure 4:
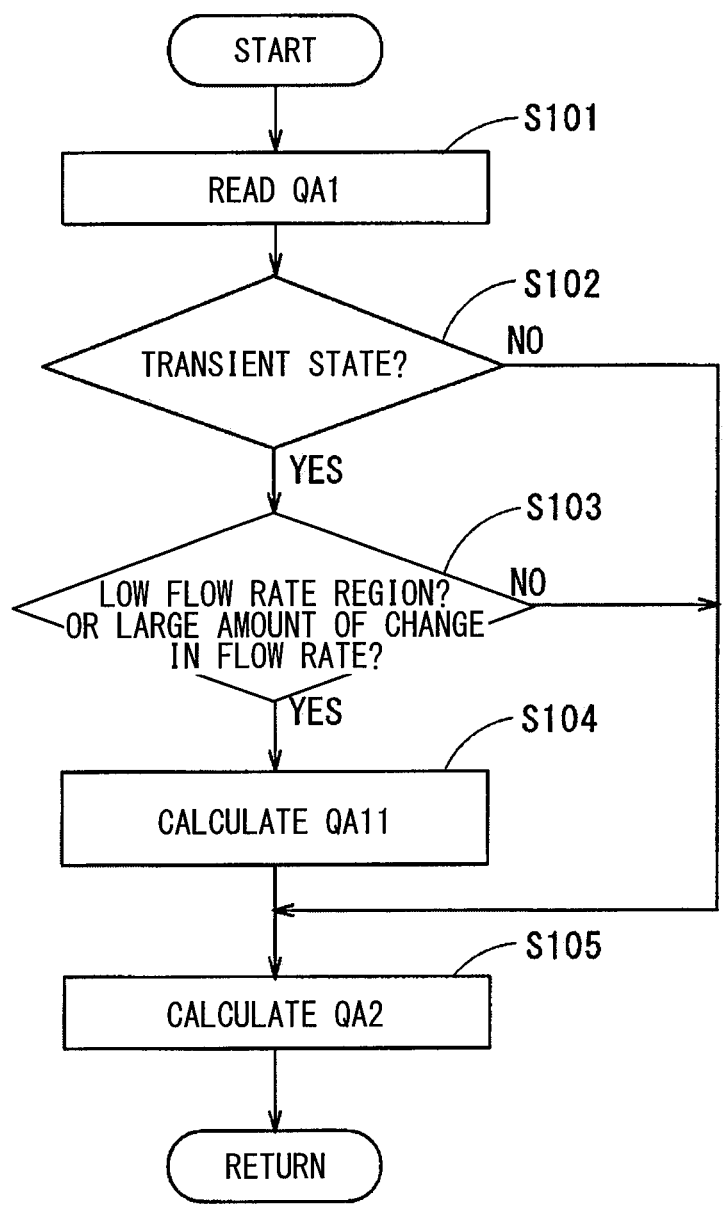
FIG. 4 is a flowchart showing the processing of a main routine.
Figure 5:
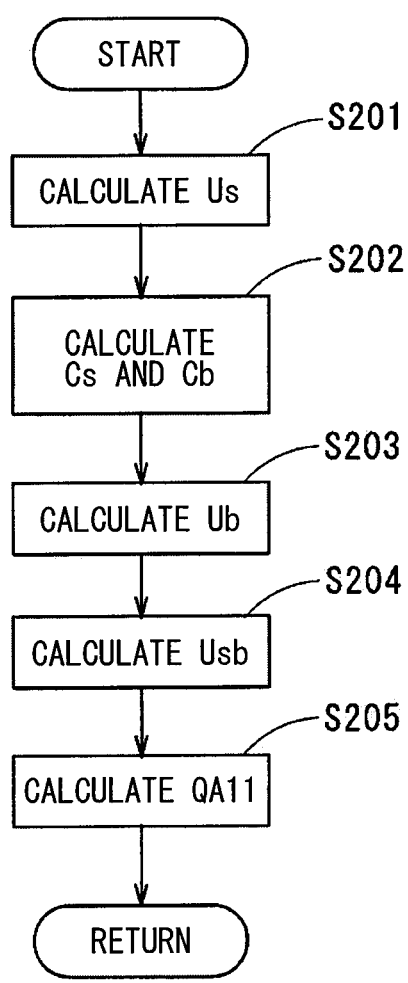
FIG. 5 is a flowchart showing the processing of a first subroutine.

Hereinafter, the functions of the bypass reference unit 57 and the heat radiation reference unit 58 will be described based on the main routine, the first subroutine, and the second subroutine shown in FIGS. 4, 5, and 6. The first subroutine is a step of the main routine, and the second subroutine is a step of the first subroutine. The main routine is executed in a predetermined cycle during the operation of the engine 2.

According to the main routine, first, the dummy estimation value QA1 of the flow rate output from the estimation unit 471Q of the calculation system 471 is read in S101. Next, in S102, it is determined whether or not the flow state is a transient state. The above determination can be made, for example, by comparing the dummy estimation value QA1(i−1) read in a previous main routine process with a dummy estimation value QA1(i) read in the current main routine process. Then, if it is determined that the current state is the transient state (YES), the process proceeds to S103, and if it is determined that the current state is not the transient state (that is, the steady state) (NO), the process proceeds to S105.

Next, in S103, it is determined whether or not the flow rate is in a low flow rate region or whether or not the amount of change in the flow rate is large according to the dummy estimation value QA1.

As a result, if it is determined that the flow rate is in the low flow rate region or the amount of change in the flow rate is large (YES), it is determined that the delay caused by the bypass becomes large, and the process proceeds to S104. If it is determined that the flow rate is not in the low flow rate region and the amount of change in the flow rate is small (NO), the process proceeds to S105. In S104, the first subroutine shown in FIG. 5 is executed.

S104 in the main routine, that is, all steps of the first subroutine are the bypass reference unit 57, and the dummy delay value QA11 of the flow rate in the main passage 50 is calculated according to the dummy estimation value QA1. In this example, the dummy delay value QA11 represents a numerical value of the flow rate in the main passage 50, and is a value is delayed behind the dummy estimation value QA1 by an amount corresponding to a delay caused by bypassing.

Hereinafter, each step of the first subroutine will be described.

First, in S201, a flow velocity Us of the main passage 50 is calculated by the following Expression 1 according to the dummy estimation value QA1, a density ρ of the fluid, and a flow channel cross-sectional area S of the flow passage.

$$Us = QA1/\rho/S \qquad \text{[Mathematical Expression 1]}$$

The flow channel cross-sectional area S is an area of the cross section of the main passage 50 at the mounting position of the airflow meter 5, excluding a projection region of the airflow meter 5.

The density ρ can be calculated on the basis of the current fluid temperature and atmospheric pressure according to a predetermined map or mathematical expression. In addition, in a map or a mathematical expression for obtaining the density ρ, the density ρ is set to be smaller as the temperature of the fluid is higher, and the air density ρ is set to be larger as the atmospheric pressure is higher.

Figure 6:
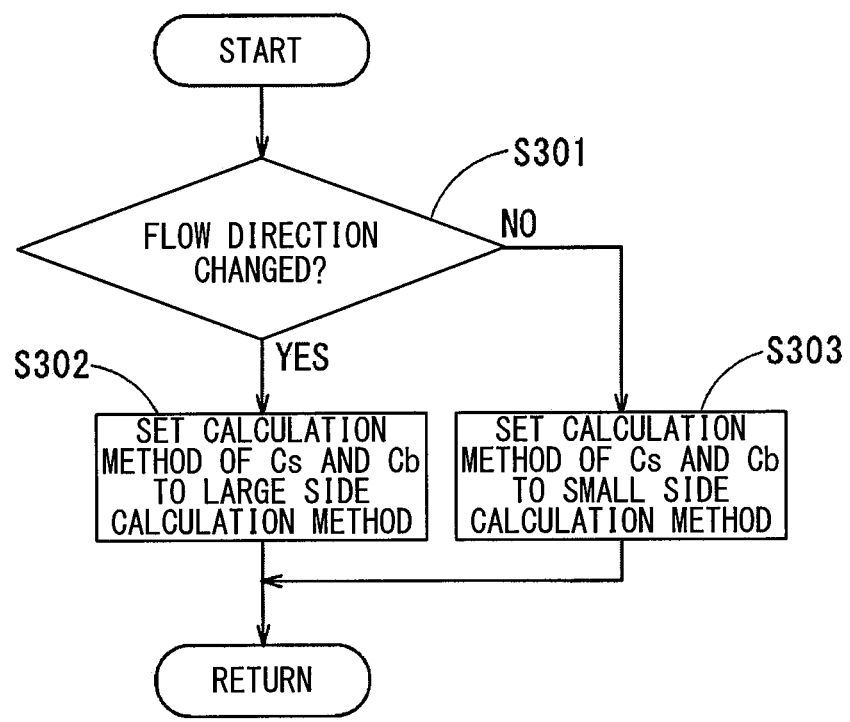
FIG. 6 is a flowchart showing the processing of a second subroutine.

Next, in S202, the second subroutine shown in FIG. 6 is executed. The second subroutine is a routine for calculating the loss coefficients Cs and Cb used at the time of calculating the dummy delay values QA11.

In the second subroutine, first, it is determined in S301 whether or not the flow direction in at least one of the main passage 50 and the bypass passage 49 has changed. In other words, S301 functions as the determination unit described above. When it is determined that the flow direction has changed (YES), the process proceeds to S302 and both the calculation methods of the loss coefficients Cs and Cb are set to the calculation method on the large side, and when it is determined that the flow direction has not changed (NO), the process proceeds to S303 and both the calculation methods of the loss coefficients Cs and Cb are set to the calculation method on the small side.

In other words, when the flow direction is switched from the forward flow to the backward flow or from the backward flow to the forward flow, the flow is disturbed and the loss rapidly increases. For that reason, there is a possibility that the accuracy of the measurement value Q is lowered at the time of switching the flow direction. Therefore, when the flow direction is switched, both the calculation methods of the loss coefficients Cs and Cb are set to the calculation method on the large side in response to the rapid increase of the loss. When the flow direction has not been changed, both the calculation methods of the loss coefficients Cs and Cb are set to the calculation method on the small side.

In this example, in S301, when it is determined that the magnitude (absolute value) of the flow rate becomes smaller than a predetermined threshold, it is determined that the flow direction has changed. The threshold is preferably 2 g/sec, and more preferably 0.5 g/sec, for example.

In addition, various numerical values relating to the flow rate, such as the dummy predicted value QA0, the dummy estimation value QA1, the dummy delay value QA2, the dummy delay value QA11, and the detection value QA, can be used for the above determination.

For example, it may be determined that the flow direction has changed when it is determined that the dummy predicted value QA0 has become smaller than the threshold while the threshold of the dummy predicted value QA0 is set, or it may be determined that the flow direction has changed when it is determined that the dummy predicted value QA1 has become smaller than the threshold while the threshold of the dummy estimation value QA1 is set.

The values of the dummy predicted value QA0, the dummy estimation value QA1, the dummy delay value QA2, and the dummy delay value QA11 are compared with the thresholds, thereby being capable of determining whether or not the flow direction has changed in the main passage 50. In addition, the numerical value of the detection value QA is compared with the threshold, thereby being capable of determining whether or not the flow direction has changed in the bypass passage 49.

In addition, in the small side calculation method set in S303, for example, the loss coefficients Cs and Cb are calculated with the flow rate and a change rate of the flow rate as parameters according to a predetermined map or a mathematical expression. In the large side calculation method set in S302, for example, the loss coefficients Cs and Cb are set to fixed values, and the fixed values are set as numerical values that are much larger than the numerical values calculated by the map or the mathematical expression for calculating the numerical values on the small side.

According to the map or the mathematical expression for calculation of the small side numerical value, the loss coefficients Cs and Cb are set so as to be smaller as the flow rate is larger, and so as to be larger as the amount of change in the flow rate is larger. The fixed value for the large side numerical value, the map and the mathematical expression for calculation of the small side numerical value are individually set for each of the loss coefficients Cs and Cb.

Next, the process returns to the first subroutine, and the flow velocity Ub of the bypass passage 49 is calculated in S203.

In this example, the flow velocity Ub can be expressed as Mathematical Expression 4 below by using the equations of motion of the fluid in the main passage 50 and the bypass passage 49 shown in Mathematical Expressions 2 and 3 below.

$$\frac{\Delta P}{\rho} = Ls\frac{dUs}{dt} + Cs \cdot Us^2 \qquad \text{[Mathematical Expression 2]}$$

$$\frac{\Delta P}{\rho} = Lb\frac{dUb}{dt} + Cb \cdot Ub^2 \qquad \text{[Mathematical Expression 3]}$$

[Mathematical Expression 4]

-continued $$Ub(i) = \frac{-\frac{Lb}{dt} \pm \sqrt{\left(\frac{Lb}{dt}\right)^2 + 4 \cdot Cb\left\{\frac{Lb}{dt}Ub(i-1) + Ls\frac{Us(i) - Us(i-1)}{dt} + Cs \cdot Us(i)^2\right\}}}{(2 \cdot Cb)}$$

In Mathematical Expressions 2 to 4, ΔP is a pressure difference between the inlet 49i and the outlets 52g, Lb is a path length along the first and second passage portions 51, 52 from the entrance 49i to the outlets 52g, and Ls is a path length outside the housing 45 along the flow of the main passage 50 from the entrance to the outlets a and b. In addition, Us(i) is a current value of the flow velocity of the main passage 50, and Us(i−1) is a previous value of the flow velocity of the main passage 50. Ub(i) is a current value of the flow velocity of the bypass passage 49, and Ub(i−1) is a previous value of the flow velocity of the bypass passage 49.

Mathematical Expressions 2 and 3 are solved for the flow velocity Ub(i) to derive Mathematical Expression 4.

Next, a delay flow velocity Usb is calculated in S204. In this example, the delay flow velocity Usb is delayed behind the flow rate Us by an amount corresponding to the delay of the flow rate change of the bypass passage 49 behind the flow rate change of the main passage 50. The delay flow velocity Usb is calculated according to the following Mathematical Expression 5, which is obtained on the assumption that the above equation of motion (Mathematical Expressions 2 and 3) holds even in a steady state (that is, on the assumption that a time-differentiated term is 0).

$$Usb = Ub \times \sqrt{Cb/Cs} \qquad \text{[Mathematical Expression 5]}$$

Next, in S205, the dummy delay value QA11 is calculated by the following Mathematical Expression 6 using the delay flow velocity Usb, the air density ρ, and the flow channel cross-sectional area S.

$$QA11 = Usb \cdot \rho \cdot S \qquad \text{[Mathematical Expression 6]}$$

Next, returning to the main routine, in S105, the dummy delay value QA2 of the flow rate in the main passage 50 in which a delay caused by heat radiation is added to the dummy delay value QA11 is calculated. In other words, S105 functions as the heat radiation reference unit 58.

Figure 7:
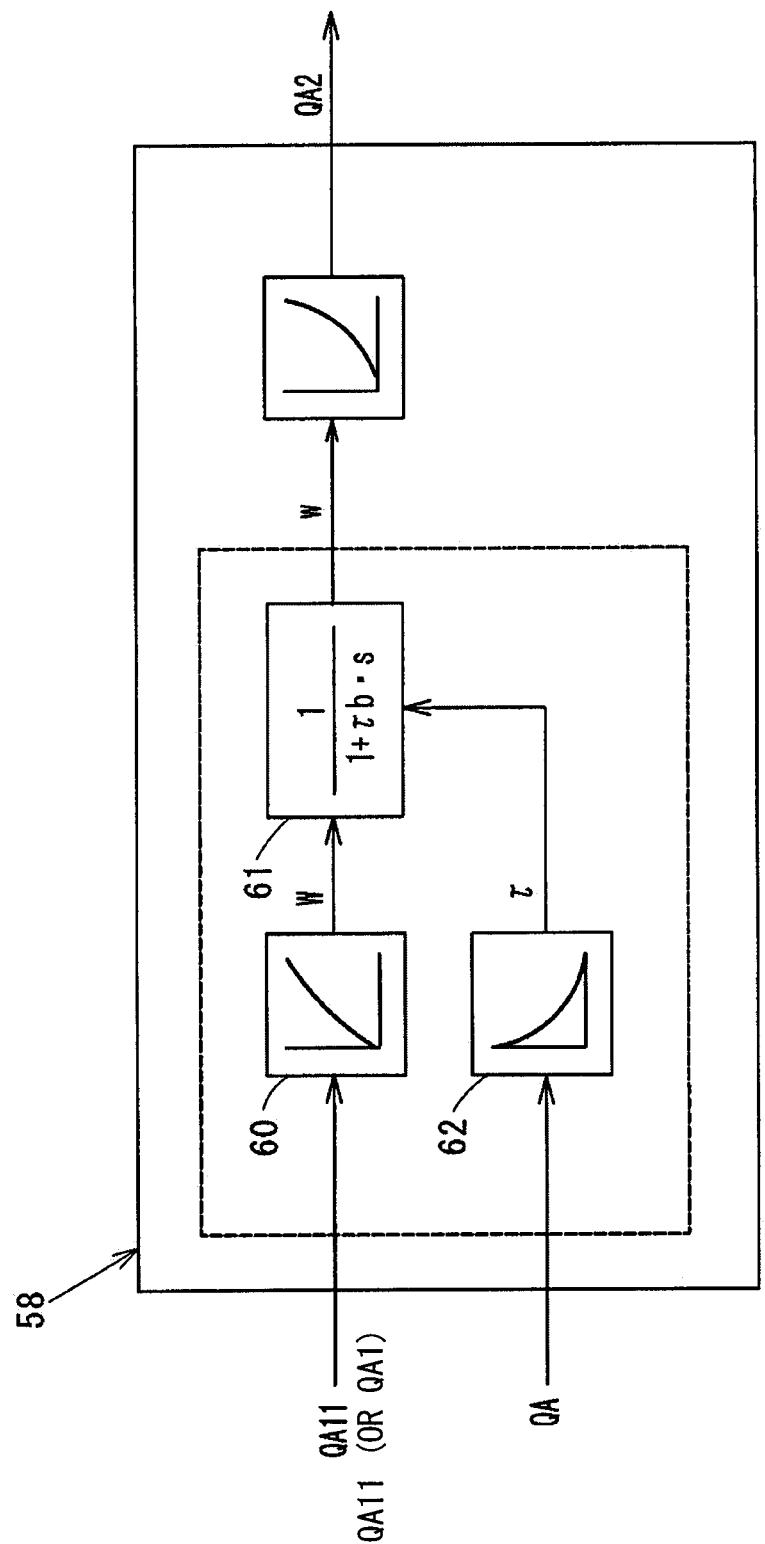
FIG. 7 is a block diagram showing a heat radiation reference unit.

Hereinafter, the heat radiation reference unit 58 will be described with reference to FIG. 7.

The heat radiation reference unit 58 includes a complete heat radiation amount calculation unit 60, a first-order delay processing unit 61, a time constant calculation unit 62, and the like.

The complete heat radiation amount calculation unit 60 calculates a complete heat radiation amount that does not include a response delay, based on the heat capacity, mass, and the like of the assembly and the like, based on the map and the like, according to the dummy delay value QA11. In that case, a total amount of heat radiation may be referred to as the complete heat radiation amount W.

The first-order delay processing unit 61 performs a first-order delay process on the complete heat radiation amount W using a time constant T of the first-order delay of the heat radiation system including the assembly, and calculates the heat radiation amount including the response delay. In that case, the amount of heat radiation may be referred to as a response heat radiation amount w.

The time constant calculation unit 62 calculates the time constant T used in the first-order delay processing unit 61 by using a map or the like in accordance with the detection value QA by the airflow meter 5.

Then, the air flow rate corresponding to the responsive heat radiation amount w is calculated by using the map or the like, and the calculated air flow rate is set as the dummy delay value QA2.

The processing in S105, that is, the heat radiation reference unit 58 is also executed when it is determined in S102 that the flow state is the steady state and when it is determined in s103 that the flow rate is not in the low flow rate region and the amount of change in the flow rate is small. In other words, the heat radiation reference unit 58 is executed when the bypass reference unit 57 is not executed (or when the dummy delay value QA11 is not calculated). In that instance, the complete heat radiation amount calculation unit 60 calculates the complete heat radiation amount W using the dummy estimation value QA1.

To more clearly appreciate the technical effects of the embodiments described in the present disclosure, consider a reference example flow rate measurement system which includes a housing, a detection unit, and a calculation unit. In the reference example device, the housing has a bypass passage for taking in a part of a fluid flowing through a main passage and returning the part of the fluid to the main passage again, and is disposed in the main passage. The detection unit is disposed in the bypass passage, and outputs a detection value corresponding to a magnitude of a flow rate of the fluid flowing through the bypass passage and a direction of the flow of the fluid. Further, the calculation unit performs an arithmetic operation for outputting a measurement value with the use of the detection value.

When the reference example flow rate measurement system is applied to, for example, a flow rate measurement of an intake air of an internal combustion engine for a vehicle, the functions of the housing and the detection unit are provided in, for example, a common airflow meter. The function of the calculation unit is provided in an electronic control unit (ECU) for controlling an operation state of the internal combustion engine.

In the reference example flow rate measurement system as described above, since it has been known that a change in the flow rate in the bypass passage is delayed behind a change in the flow rate in the main passage, the calculation unit typically includes a function of compensating for the above delay. In other words, since the detection value by the detection unit is delayed behind an actual flow rate at the same time in the main passage, the calculation unit may compensate for the delay of the detection value as a calculation for outputting the measurement value.

Incidentally, in the calculation for the delay compensation, equations of motion of the fluid in the main passage and the bypass passage are used, and the equations of motion includes the respective loss coefficients of the main passage and the bypass passage. However, when the flow direction is switched from a forward flow to a backward flow or from the backward flow to the forward flow, the flow is disturbed and the loss rapidly increases. For that reason, in the case of the reference example device, there is a concern that the accuracy of the measurement value is lowered at the time of switching the flow direction.

In contrast, according to the measurement system 1 of the embodiment, the ECU 3 calculates the measurement value Q of the flow rate in the main passage 50 by compensating, as required, for a fact that the change in the flow rate in the bypass passage 49 is delayed behind the change in the flow rate in the main passage 50. In addition, the ECU 3 calculates the respective loss coefficients Cs and Cb of the main passage 50 and the bypass passage 49, and performs arithmetic operation required for compensating using the calculated loss coefficients Cs and Cb. Then, in the calculation of the loss coefficient Cs, two calculation methods are selectively used when the magnitude of the loss coefficient Cs is small and when the magnitude is large, and in the calculation of the loss coefficient Cb, two calculation methods are selectively used when the magnitude of the loss coefficient Cb is small and when the magnitude is large.

Further, the ECU 3 has a determination unit for determining whether or not the direction of the flow has changed in the main passage 50, and the determination unit uses a large side calculation method for the loss coefficients Cs and Cb when it determines that the direction of the flow has changed, and uses a small side calculation method when it determines that the direction of the flow has not changed.

As a result, even if the flow loss rapidly increases with the switching of the flow direction, the delay compensation can be executed with high accuracy by calculating the loss coefficients Cs and Cb using a large side calculation method. For that reason, in the measurement system 1, the deterioration of the measurement accuracy when the flow direction is switched can be reduced.

In particular, when the surging of the turbo is eliminated by opening the valve of the ABV 29, there is no pulsation due to the surging, the intake pulsation due to the intake and exhaust becomes small, and the switching of the low flow rate and the flow direction frequently occurs.

For that reason, the effect of inhibiting the deterioration of the measurement accuracy is particularly remarkable when the surging of the turbo is eliminated by opening the ABV 29.

In addition, according to the measurement system 1, when the ECU 3 determines that the magnitude of the flow rate is smaller than a predetermined threshold, it is determined that the flow direction has changed.

This makes it possible to easily execute the determination as to whether or not the flow direction has changed.

The present disclosure may be modified to various modifications without departing from the spirit of the present disclosure.

For example, according to the measurement system 1 of the embodiment, the ECU 3 determines that the flow direction has changed when it is determined that the magnitude of the flow rate has become smaller than a predetermined threshold, but the mode of the determination unit is not limited to the above example.

For example, it may be determined that the flow direction has changed when the sign of the numerical value of the flow rate is switched from + to − or from − to +. Similarly, in that instance, various numerical values relating to the flow rate, such as the dummy predicted value QA0, the dummy estimation value QA1, the dummy delay value QA2, the dummy delay value QA11, and the detection value QA, can be used as the numerical value of the flow rate. Further, a comparison between the current value and the previous value of those numerical values may be used, or a comparison between the previous value and a value before the previous value may be used to determine whether or not the reference numeral has been switched.

Further, it may be determined whether or not the flow direction has changed based on the rotational speed NE of the engine 2, the throttle opening degree, a negative pressure of the intake pipe 4, the rotational speed of the turbocharger 20, the operation of the ABV 29, and the like.

In addition, according to the measurement system 1 of the embodiment, the ECU 3 calculates the loss coefficients Cs and Cb by a predetermined map or mathematical expressions when it is determined that the flow direction has not changed. The ECU 3 sets fixed values which are much larger than the numerical values calculated by the map or mathematical expressions as the loss coefficients Cs and Cb when it is determined that the flow direction has changed, but the mode of the loss coefficients Cs and Cb are not limited to the above values.

For example, the loss coefficients Cs and Cb may be calculated by a predetermined map or mathematical expression when it is determined that the flow direction is not changed, and the loss coefficients Cs and Cb may be calculated by multiplying a numerical value calculated by the map or mathematical expression by a predetermined coefficient when it is determined that the flow direction has been changed.

Although the present disclosure has been described in accordance with the examples, it is understood that the disclosure is not limited to such examples or structures. The present disclosure encompasses various modifications and variations within the scope of equivalents. In addition, various combinations and configurations, as well as other combinations and configurations that include only one element, more, or less, are within the scope and spirit of the present disclosure.

The invention claimed is:

1. A flow rate measurement system that outputs a measurement value which represents a magnitude of a flow rate and a flow direction of a fluid that flows through a particular main passage in which backflow may occur, the flow measurement system comprising:
   a housing that includes a bypass passage which takes in a portion of the fluid flowing through the main passage and returns the portion of the fluid back to the main passage, the housing being disposed in the main passage;
   a detection unit disposed in the bypass passage that outputs a detection value corresponding to a magnitude of a flow rate and a flow direction of the fluid flowing through the bypass passage; and
   a calculation unit that, by using the detection value, performs an arithmetic operation for outputting the measurement value, wherein
   the calculation unit calculates the measurement value by compensating as needed for a delay in the change in flow rate in the bypass passage with respect to the change in flow rate in the main passage,
   the calculation unit performs an arithmetic operation required for the compensation by using at least one of loss coefficients of the main passage or the bypass passage, and selectively uses one of at least two calculation methods depending whether a magnitude of the loss coefficient is small or a magnitude of the loss coefficient is large, and
   the calculation unit includes a determination unit that determines whether or not the flow direction has changed in at least one of the main passage or the bypass passage, uses a large side calculation method related to the calculation of the loss coefficient if the determination unit determines that the flow direction has changed, and uses a small side calculation method related to the calculation of the loss coefficient if the determination unit determines that the flow direction has not been changed.

2. The flow rate measurement system according to claim 1, wherein the determination unit determines that the flow direction in at least one of the main passage or the bypass passage has changed when the magnitude of the flow rate in at least one of the main passage or the bypass passage is determined to be smaller than a predetermined threshold.

3. A flow rate measurement system that outputs a measurement value indicating a magnitude of a flow rate and a flow direction of a fluid that flows through a main passage, the flow measurement system comprising:

a housing that includes a housing passage which takes in a portion of the fluid and returns the portion of the fluid to the main passage, the housing being disposed in the main passage;

a detection unit disposed in the housing passage that outputs a detection value corresponding to a magnitude of a flow rate and a flow direction of the fluid flowing through the housing passage; and a calculation unit that calculates the measurement value by using the detection value, wherein the calculation unit calculates the measurement value by compensating for a delay in the change in flow rate of the fluid in the housing passage with respect to the change in flow rate of the fluid in the main passage, the calculation unit performs an arithmetic operation required for compensation by using at least one of loss coefficients of the main passage or the housing passage, and selectively uses one of a large side calculation or a small side calculation in the calculation of the loss coefficient, the calculation unit includes a determination unit that determines whether the flow direction has changed in at least one of the main passage or the housing passage, and the calculation unit uses the large side calculation for the calculation of the loss coefficient when the determination unit determines that the flow direction has changed, and uses the small side calculation for the calculation of the loss coefficient when the determination unit determines that the flow direction has not been changed.

4. The flow rate measurement system according to claim 3, wherein
the determination unit determines that the flow direction in at least one of the main passage or the housing passage has changed when determining that the magnitude of the flow rate in at least one of the main passage or the housing passage is smaller than a predetermined threshold.

5. The flow rate measurement system according to claim 3, wherein
the determination unit determines that the flow directions in both of the main passage and the housing passage are not changed when determining that the magnitudes of the flow rates in both of the main passage and the housing passage are larger than a predetermined threshold.

6. A flow rate measurement system, comprising:
a main passage in which a fluid flows;
a housing that includes a bypass passage configured to intake a portion of the fluid flowing through the main passage and return the portion of the fluid back to the main passage, the housing being disposed in the main passage;
a thermal flow rate sensor disposed in the bypass passage that outputs a detection value corresponding to a magnitude of a flow rate and a flow direction of the fluid flowing through the bypass passage; and
a processor coupled to the thermal flow rate sensor, the processor being programmed to calculate, based on the detection value from the thermal flow rate sensor, a measurement value representing the magnitude of a flow rate and a flow direction of the fluid that flows through the main passage, wherein
the calculation of the measurement value includes the processor being programmed to:
determine whether a flow direction has changed in at least one of the main passage or the bypass passage,
calculate at least a loss coefficient of the main passage or a loss coefficient of the bypass passage, the loss coefficients of the main passage and the bypass passage being calculated as larger values when the flow direction is determined to have changed as compared to when the flow direction is determined to have not changed, and
compensate the measurement value for a delay in the change in flow rate in the bypass passage with respect to the change in flow rate in the main passage based on at least the loss coefficient of the main passage or the loss coefficient of the bypass passage.

* * * * *